Jan. 31, 1967   E. F. GLASS   3,300,953
HAY HARVESTER
Filed Dec. 11, 1964   4 Sheets-Sheet 3
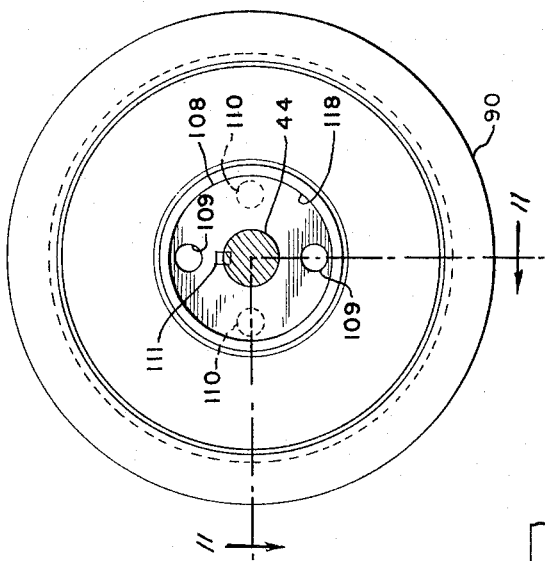
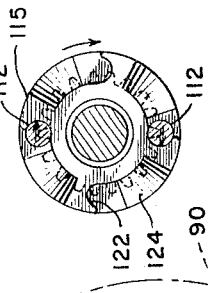
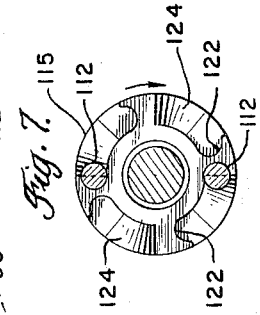
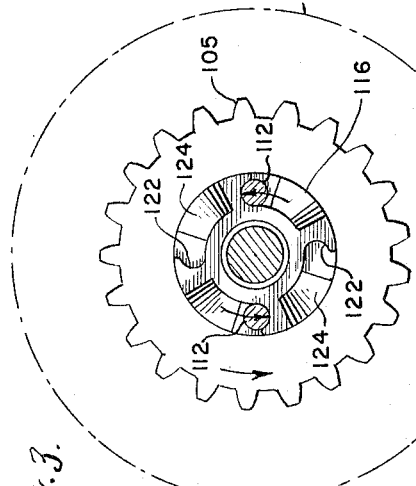
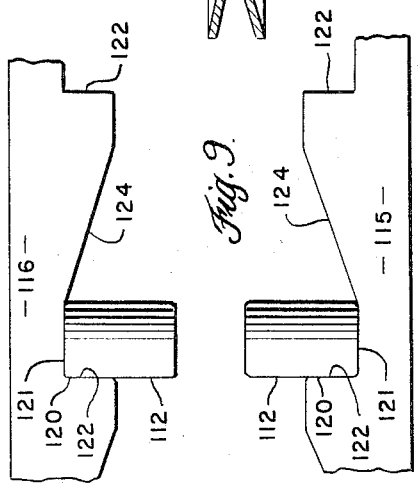
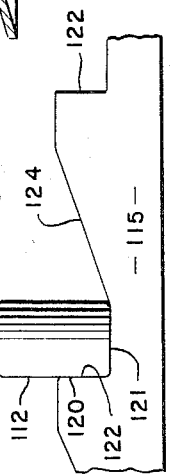
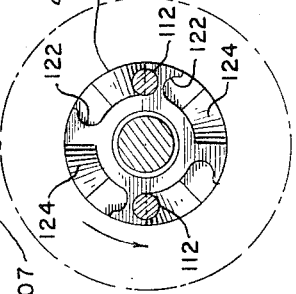
INVENTOR.
EMMETT F. GLASS
BY Walter V. Wright
AGENT Jan. 31, 1967     E. F. GLASS     3,300,953
HAY HARVESTER
Filed Dec. 11, 1964     4 Sheets-Sheet 4
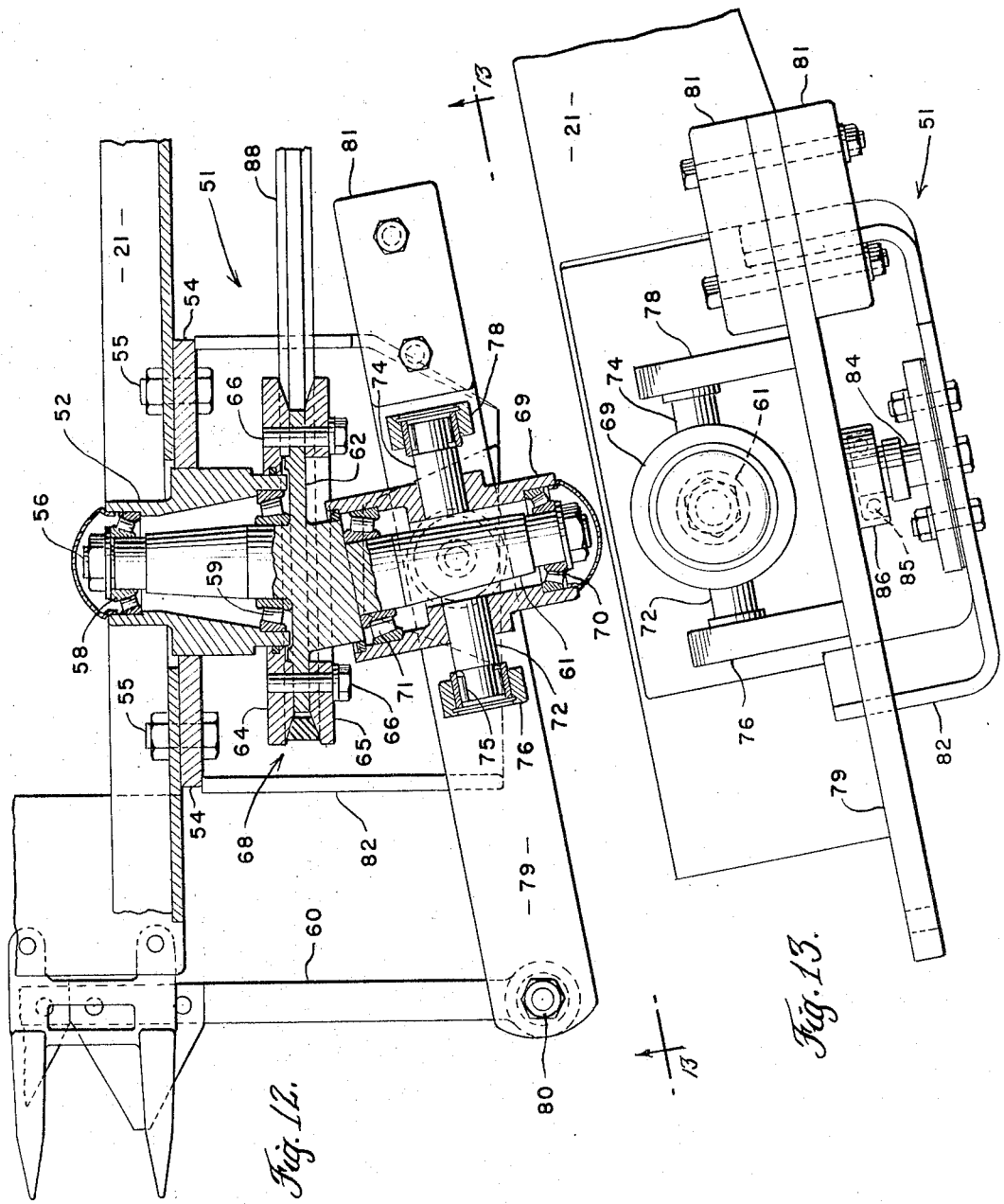
INVENTOR.
EMMETT F. GLASS
BY *Walter V. Wright*
AGENT

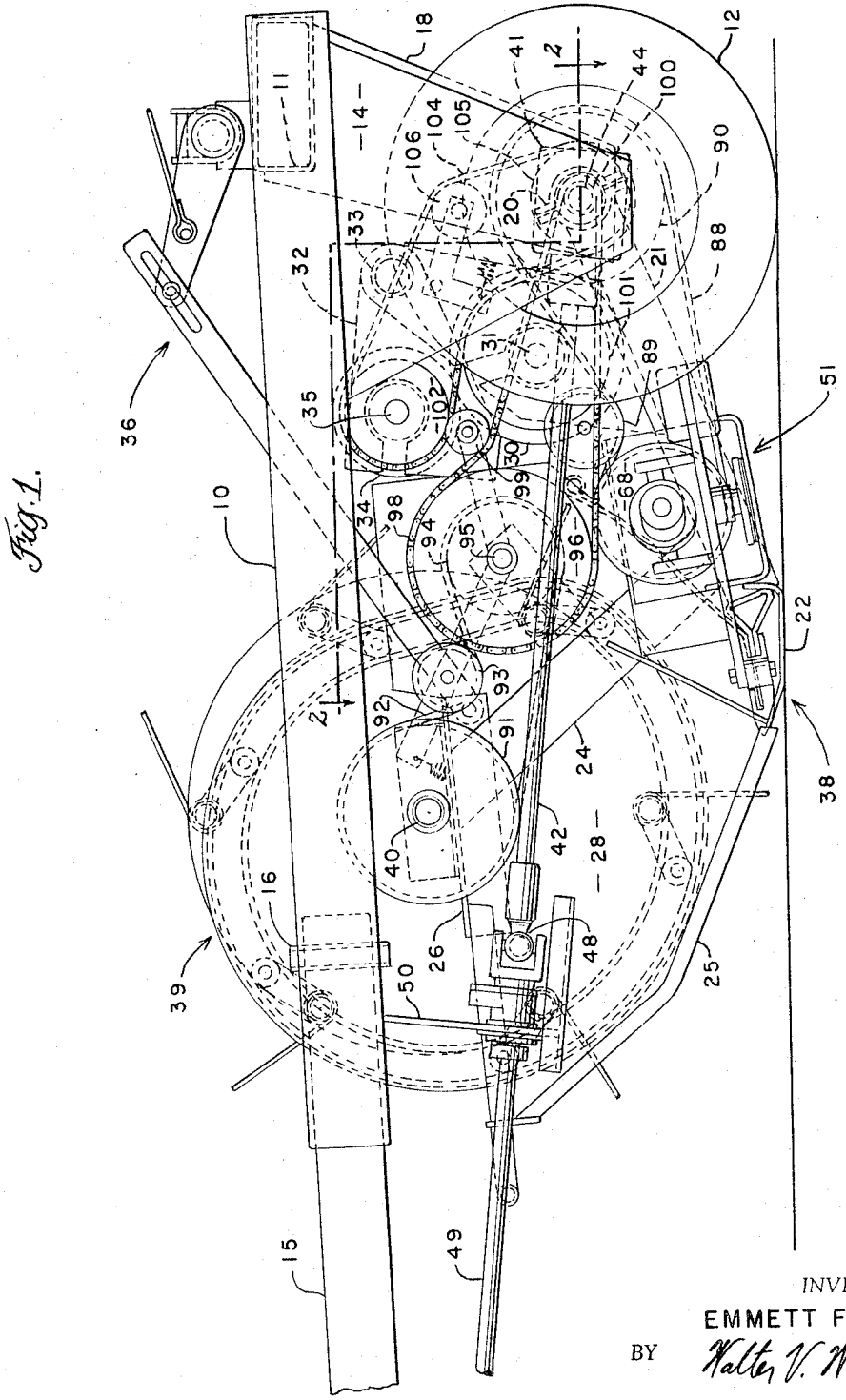

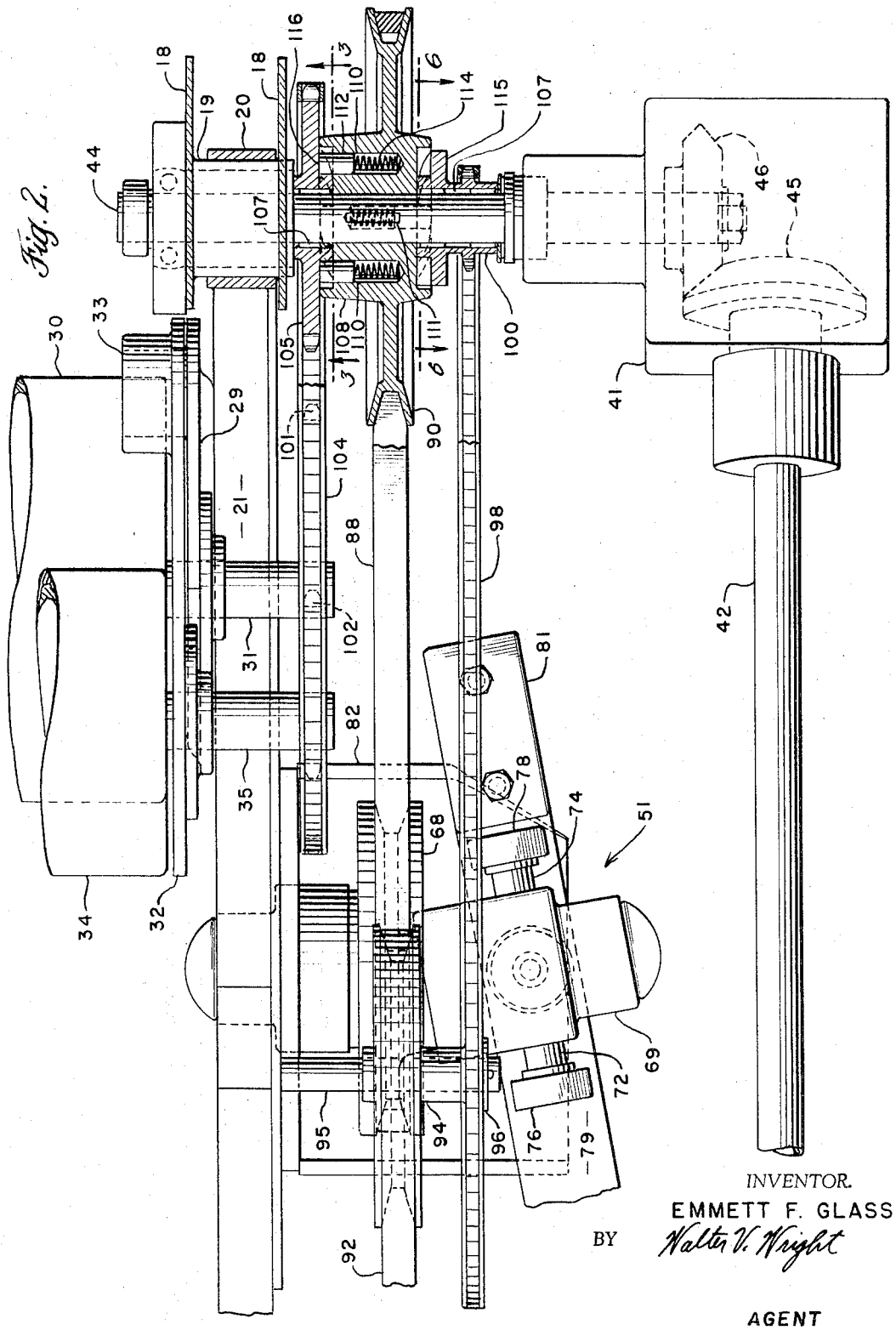

United States Patent Office 3,300,953
Patented Jan. 31, 1967

3,300,953
HAY HARVESTER
Emmett F. Glass, Akron, Pa., assignor to Sperry Rand Corporation, New Holland, Pa., a corporation of Delaware
Filed Dec. 11, 1964, Ser. No. 417,688
8 Claims. (Cl. 56—23)

This invention relates generally to hay harvesting equipment.

More specifically, this invention relates to drive mechanism in a hay harvesting machine adapted to be towed behind a tractor and having a mower, a pair of crop conditioning rolls and a crop gathering reel operable to sweep hay over the mower and into the crop conditioning rolls, thereby affording high capacity mowing and conditioning of a hay crop or the like in one operation. The source of driving power for the mower, the reel, and the conditioning rolls is the power-take-off mechanism of the towing vehicle. Some tractor power-take-off shafts are free-running when they are not under driving power while others are automatically locked in place when the driving power is disengaged. A mower which reciprocates and experiences considerable operating resistance tends to stop abruptly when its source of driving power is interrupted. The larger mass and different speed rotary motion of a crop gathering reel and a pair of conditioning rolls causes these members to attempt to rotate under the influence of inertia after their source of driving power has been discontinued. This causes shock and backlash loads which travel through the drive train upon disconnection of the driving power and lead to premature failure of drive train components.

It is an object of this invention to provide mechanically simple, low cost drive means for a hay harvesting machine having a mower, a crop gathering reel and a pair of crop conditioning rolls.

It is another object of this invention to provide in a hay harvesting machine, drive means for a mower, a crop gathering reel and a pair of crop conditioning rolls which is free from backlash and impact loads upon stoppage of the machine although the inertia of each of the mower, reel and rolls is different.

It is another object of this invention to provide drive means for a hay harvesting machine having a mower, a crop gathering reel and a pair of crop conditioning rolls wherein a single drive shaft positively drives all three units while enabling the reel and rolls to free wheel either at the same or different speeds.

It is another object of this invention to provide in a hay harvesting machine compact low cost means for driving a mower, a crop gathering reel and a pair of crop conditioning rolls from power-take-off means of either the free running or locked type which eliminates backlash and impact loads from the drive train upon stoppage of the machine.

It is another object of this invention to provide in a hay harvesting machine, drive means for a mower, a crop gathering reel and a pair of crop conditioning rolls wherein independent free wheeling is provided for the reel and both crop conditioning rolls by compact overrunning clutch means having driven members incorporated into the reel and conditioning roll drive members and driving members incorporated into the mower driving member.

These and other objects and advantages of the invention will be apparent from reference to the following description and claims taken in conjunction with the accompanying drawings wherein:

FIG. 1 is a side elevational view of a hay harvesting machine having drive means constructed in accordance with the principles of the present invention;

FIG. 2 is a fragmentary enlarged sectional view taken on the line 2—2 of FIG. 1;

FIG. 3 is a sectional view taken on the line 3—3 of FIG. 2;

FIG. 4 is a fragmentary sectional view of the clutch means of the present invention similar to the showing in FIG. 2 but with the sprockets shown in the act of free wheeling;

FIG. 5 is a fragmentary sectional view taken on the line 5—5 of FIG. 4;

FIG. 6 is a sectional view taken on the line 6—6 of FIG. 2;

FIG. 7 is a sectional view similar to that of FIG. 6 but showing the clutch parts in the act of free wheeling;

FIGS. 8 and 9 are fragmentary enlarged developed views of the coacting driving and driven elements of the clutches showing the relationship between the driving pins and the faces of the driven clutch members;

FIG. 10 is an axial view of the main mower and clutch driving member;

FIG. 11 is a sectional view taken on the line 11—11 of FIG. 10;

FIG. 12 is a plan sectional view through the mower driving head; and

FIG. 13 is an end view of the mower driving head taken as indicated by the line 13—13 of FIG. 12.

Referring to the drawings in detail, particularly to FIGS. 1 and 2, the machine has a main frame which is L-shaped when viewed in plan. A first main frame member 10 constitutes one leg of the L and extends fore-and-aft relative to the direction of travel of the machine, which is from right to left as seen in FIG. 1. A second main frame member 11 extends from the rearmost end of frame member 10 transversely relative to the direction of travel. A pair of ground wheels 12 (one shown) are provided at the respective ends of transverse main frame member 11. The wheels are journalled on frame members 14 which extend downwardly from main frame members 10 and 11. A draft tongue or drawbar 15 extends forwardly from the front end of main frame member 10 and is pivotally connected thereto at 16 for horizontal swinging movement between an operating position and a road transport position. Conventional hitch means not shown is carried by drawbar 15 at the front end thereof for connection to a tractor or other towing vehicle.

A sub-frame structure is supported from the main frame and disposed generally in front of transverse main frame member 11 and to one side of fore-and-aft main frame member 10. Pairs of frame plates 18 (FIG. 2) depend from main frame member 11 at each end thereof. Sleeves 19 welded between the plates 18 serve as pivot journals for the sub-frame. Split mounting sleeves 20 are carried on the sleeves 19 and have downwardly and forwardly extending sub-frame side members 21 fixedly attached thereto. The sub-frame side members 21 extend downwardly and forwardly from sleeves 20 to ground shoes, or runners, 22 (FIG. 1). Additional sub-frame side members 24 and 25 extend upwardly and forwardly, respectively, from frame members 21 and ground shoes 22. A gathering reel journal structure 26 (FIG. 1) and end plate 28 are carried by frame members 24 and 25 and constitute a part of the sub-frame structure. An upstanding plate 29 (see FIG. 2) is carried by and extends upwardly from each sub-frame side member 21 just forwardly of mounting sleeves 20. A first or lower crop conditioning roll 30 extends between plates 29 and has the ends of its shaft 31 journalled therein. A second plate 32 is journalled on each of the plates 29 by sleeve journals 33. The journals 33 may be seen in phantom lines in FIG. 1. A second or upper crop conditioning roll 34 extends between the plates 32 and has the ends of its shaft 35 journalled therein. Conventional lift linkage partially shown and indicated generally by the reference numeral 36 in FIG. 1 is provided between the main frame and sub-frame for raising the sub-frame from the operative position shown in FIG. 1 to a road transport position wherein the ground shoes 22 are off the ground.

A sickle bar-type mower, indicated generally by the reference numeral 38, is carried by the sub-frame structure and extends thereacross at ground shoes 22.

A conventional crop gathering reel of the cam operated tine type is indicated generally by the reference numeral 39. It has a central shaft 40 whose ends are journalled in the reel journal structures 26 previously mentioned. Reel 39 extends transversely across the front of the sub-frame structure generally above mower 38. The inter-relationship of the conditioner rolls 30 and 34, mover 38 and reel 39 on the sub-frame structure may be seen in FIG. 1.

A right angle gearbox 41 (see FIG. 2) is mounted on the inboard side of left ground wheel journalling plate 14. Gearbox 41 has a forwardly extending power input shaft 42 and a power output shaft 44 which extends transversely relative to the direction of travel and is coaxial with the axis of the sleeve journals 19 and 20 of the sub-frame structure. The output shaft 44 of gearbox 41 serves as the drive shaft for the mower, conditioning rolls and reel and receives its power from input shaft 42 through bevel gears 45 and 46. In FIG. 1 it may be seen that power input shaft 42 is provided with a universal joint 48 disposed directly under the drawbar pivot member 16. Input shaft 42 has a forward extension 49 which is journalled in a bracket 50 depending from pivoted drawbar 15. At the forwardmost end of drive input extension 49, conventional power-take-off coupling means are provided by which the gearbox power input shaft may be coupled in driven relation to the power output shaft of a towing tractor.

In FIG. 1 it may be seen that mower 38 is provided with a wobble type driving head indicated generally by the reference numeral 51. This driving head is shown in greater detail in FIGS. 12 and 13. The wobble drive has a first journal housing 52 provided with rigid side flanges 54 by which the journal housing is attached to sub-frame member 21 by bolts 55. A first crank-like arm 56 is journalled in housing 52 on tapered roller bearings 58 and 59 with its axis parallel to the sickle bar 60 of mower 38. A second crank-like arm 61 is formed integrally with crank arm 56 and has an axis extending at an angle to the axis of first crank-like arm 56. In the area where the two crank arms 56 and 61 join, an annular flange 62 is formed integrally therewith. The flange 62 receives on opposite sides thereof the halves 64 and 65 of a drive sheave. Bolts 66 serve to assemble the drive sheave by fixedly attaching the sheave halves to the flange 62. The mower drive sheave will be referred to in its entirety by the reference numeral 68 applied thereto, generally. The axis of rotation of sheave 68 is the same as the longitudinal axis of first crank-like arm 56. A housing 69, similar to the housing 52 is journalled on second crank-like arm 61 by tapered roller bearings 70 and 71. Housing 69 carries pins 72 and 74 which project from diametrically opposite sides of the housing. The pins 72 and 74 have their outer ends journalled in needle bearings 75 carried by parallel stanchions 76 and 78 fixedly carried by a rocker arm 79. One end of rocker arm 79 is pivotally connected at 80 to the sickle bar 60 of mower 38. The opposite end of rocker arm 79 carries counter weights 81. A generally U-shaped guard and support plate 82 underlies rocker arm 79 and carries a steady-rest 84. A ball bearing 85 is carried by steady-rest 84 and received in a sleeve 86 depending from and rigidly mounted on rocker arm 79.

When sheave 68 rotates the wobble crank about the axis of first crank arm portion 56, the second crank arm portion 61 generates an hour glass shaped path with the axes of pins 72 and steady-rest 84 intersecting at the center, or neck, of the hour glass shape. The housing 69 rotates relative to second crank-like arm 61 to allow pins 72 and 74 to remain in a single plane. The steady-rest mounting 84 of rocker arm 79 establishes this plane. As the wobble crank rotates, the pins 72 and 74 are confined to oscillatory movement in a plane parallel to the plane of rocker arm 79. This drives rocker arm 79, through the stanchions 76 and 78, in oscillation. The arm 79, in turn, reciproates sickle bar 60 through pivot connection 80.

In FIG. 1, the sheave 68, or rotatable drive power receiving member, of mower wobble drive head 51 may be seen. An endless drive member 88 is entrained about sheave 68, a conventional idler pulley 89 and a larger diameter drive member 90 on gearbox output shaft 44. A pulley 91 is fixed to the central shaft 40 of crop gathering reel 39. An endless member 92 is entrained about pulley 91, a spring loaded idler pulley 93 and a pulley 94 journalled on a short jack shaft 95. Jackshaft 95 is mounted on the sub-frame. Pulley 94 has formed integrally therewithin a larger diameter driving sprocket 96. Sprocket 96 receives driving power from gearbox output shaft 44 through an endless chain 98 which is wrapped about the sprocket 96, a conventional spring loaded idler 99 and a second rotatable drive member 100 carried by gearbox output shaft 44. The shafts 31 and 35 of conditioner rolls 30 and 34 have sprockets 101 and 102 keyed thereto, respectively. An endless member 104 is wrapped about the forward side of upper roll sprocket 102, the rearward side of lower roll sprocket 101, a rotatable driving member 105 on gearbox output shaft 44 and a conventional spring loaded idler sprocket 106 which engages the slack side of endless driving member 104. These are the three endless type drive trains which transmit driving power to the mower, the reel and the conditioner rolls from the output shaft 44 of gearbox 41.

Referring now to FIGS. 2–11 of the drawings, the relationship of the rotatable drive members 90, 100 and 105 to drive shaft 44 and to each other will be explained. In FIGS. 2, 4, 10 and 11 it may be seen that the hub portion 108 of first drive member 90 is provided with first and second pairs of axial bores 109 and 110, respectively. The hub 108 is fixed to shaft 44 by a key 111 best seen in FIG. 10. The bores 109 open axially toward second rotatable drive member 100 and are located in the hub 108 radially outwardly from the central bore which receives shaft 44. The bores 110 open axially toward the third rotatable drive member 105 and are angularly displaced ninety degrees from the pair of bores 109. Clutch driving elements in the form of pins 112 are slidably received in each of the bores 109 and 110. Coil springs 114 are disposed in each of the bores 109 and 110 behind the clutch pins 112. The springs 114 bias the pins 112 of bores 109 axially toward the second rotatable driving member 100 while the springs 114 in bores 110 bias the pins 112 in these bores axially toward third rotatable driving member 105. It may be seen in FIGS. 2 and 4 that second rotatable drive member 100 has formed integrally therewith ratchet means 115 while third rotatable drive member 105 has ratchet means 116 formed integrally thereon. The ratchet means 115 and 116 are in the form of axially directed annular extensions of the members 100 and 105. They operate respectively in annular recesses 118 and 119 in the hub 108 (see FIG. 11).

In the fragmentary enlarged views of FIGS. 8 and 9 it may be seen that the clutch driving pins 112 have longitudinally extending driving surfaces 120 and axial camming end surfaces 121. The respective ratchet means 116 and 115 have radially and axially extending driving surfaces 122 which are engaged by the driving surfaces 120 of pins 112 to effect driving engagement of the respective clutches. The ratchet means 115 and 116 also have inclined axial faces 124 disposed to engage the axial camming ends 121 of the pins 112. In FIGS. 8 and 9, the pins 112 are in position to drive the ratchet means 115 and 116 from right to left through engagement of the surfaces 120 and 122. If the pins, which are carried by first drive member 90, stop driving, the ratchet means 115 and 116 are free to overrun the pins 112 with the cam surfaces 124 merely driving the pins 112 axially into their respective bores 109 and 110 upon overcoming the relatively weak pin loading springs 114. In FIGS. 2 and 4, respectively, the clutches are shown in section with the pins 112 in axially projected driving engagement and in axially retracted overrunning position. The pins 112 are shown in driving engagement with the ratchet means 116 in FIG. 3 and in the act of overrunning, or free wheeling, in FIG. 5. The other set of driving pins 112 are shown in driving engagement with the ratchet means 115 in FIG. 6 and in the act of permitting overrunning or free wheeling in FIG. 7.

It will be apparent from the relative sprocket and pulley diameters visible in FIG. 1, and the relative diameters of the rotatable drive members 90, 100 and 105, that the first rotatable driven member 68 of the mower driving head is driven at high speed while the conditioner roll sprockets and the reel drive pulley are driven at progressively slower speeds. The second and third rotatable driving members 100 and 105 are journalled for rotation relative to shaft 44 on bushings 107. The driving connection between drive members 100 and 105 and the drive shaft 44 is through the pin and ratchet means of the respective clutches and the first rotatable drive member 90 which is fixed by key 111 to the shaft 44. When the gearbox power input shaft 44 is stopped, the mower 38 characteristically stops abruptly. This stops first drive member 90 abruptly while the endless belt 88 provides a cushioning action for the sudden stoppage. The reel and conditioning rolls which operate under less resistance that the mower and which have considerable rotational inertia, are free to overrun drive shaft 44 and expel their kinetic energy slowly without introducing shock loads to the drive train.

The elimination of backlash and shock loads afforded by the drive mechanism of this invention provides long drive train service life accompanied by ruggedness and mechanical simplicity in a relatively low cost driving mechanism of compact size. The laterally compact drive mechanism facilitates maximum use of the overall machine width for the reel, mower and conditioning rolls thereby enabling the harvesting of a swath of maximum width by a machine of minimum width.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A harvesting machine for hay or the like comprising a mower having a first rotatable power receiving member, a reel having a second rotatable power receiving member, a crop conditioning roll having a third rotatable power receiving member, a rotatable drive shaft, a first drive member fixed on said drive shaft for rotation therewith, a second drive member journalled on said drive shaft for rotation relative thereto and disposed adjacent one side of said first drive member, a third drive member journalled on said drive shaft for rotation relative thereto and disposed adjacent the opposite side of said first drive member, means interconnecting said first drive member and said first rotatable member and transmitting driving power therebetween, means interconnecting said second drive member and said second rotatable member and transmitting driving power therebetween, means interconnecting said third drive member and said third rotatable member and transmitting driving power therebetween, and overrunning clutch means driving said second and third drive members from said first drive member upon rotation of said drive shaft and freeing said second and third drive members to overrun said first drive member and said shaft upon stoppage of the drive shaft.

2. A harvesting machine for hay or the like comprising a mower having a first rotatable power receiving member, a crop gathering reel having a second rotatable power receiving member, a crop conditioning roll having a third rotatable power receiving member, a rotatable drive shaft, a first drive member fixed on said drive shaft for rotation therewith, a second drive member journalled on said drive shaft for rotation relative thereto and disposed along one side of said first drive member, a third drive member journalled on said drive shaft for rotation relative thereto and disposed along the opposite side of said first drive member, means interconnecting said first drive member and said first rotatable member and transmitting driving power therebetween, means interconnecting said second drive member and said second rotatable member and transmitting driving power therebetween, means interconnecting said third drive member and said third rotatable member and transmitting driving power therebetween, first coacting overrunning clutch means on said first and second drive members for driving said second drive member from said first drive member upon rotation of said drive shaft, and second coacting overrunning clutch means on said first drive member and said third drive member for driving said third drive member from said first drive member upon rotation of said drive shaft whereby said second and third drive members are free to overrun said first drive member upon stoppage of said drive shaft.

3. A harvesting machine as recited in claim 2 wherein said first over-running clutch means comprises fixed ratchet means on one of said first and second drive members and a plurality of pins carried by the other of said first and second drive members for movement axially relative to said drive shaft toward and away from said one of said drive members, and springs carried by said pin carrying member and yieldably urging said pins axially into engagement with said ratchet means.

4. A harvesting machine as recited in claim 3 wherein said pins have longitudinal driving sides and axial camming ends, and wherein said ratchet means comprises a plurality of surfaces extending axially and radially relative to said drive shaft and engageable by said driving sides of said pins upon driving rotation of the drive shaft, and a plurality of camming surfaces engageable with the axial ends of said pins and operable to cam said pins axially out of engagement with said axially and radially extending surfaces and allow overrunning of said second drive member upon stoppage of said drive shaft.

5. A harvesting machine as recited in claim 4 wherein said second overrunning clutch means on said first and third drive members comprises second pin and ratchet means identical to those of said first overrunning clutch means and displaced angularly about said drive shaft relative to said first clutch means.

6. A harvesting machine as recited in claim 5 wherein said pins of both said first and second overrunning clutch means are all carried by said first drive member and said first and second ratchet means are respectively provided on the sides of said second and third drive members facing said first drive member.

7. A hay harvesting machine comprising a mobile frame adapted to be towed by a vehicle through a field of hay or the like to be harvested, a reciprocable sickle bar mounted on said frame and extending transverse to the direction of travel, drive means connected to said sickle bars and having a first rotary drive power receiving members disposed at one side of said frame, a hay gathering reel journalled on said frame generally above said sickle bar and extending transverse to the direction of travel of said frame, said reel having a second rotary drive power receiving member carried thereon and disposed at said one side of said frame, a hay conditioning roll journalled on said frame rearwardly of said sickle bar and having a third rotary drive power receiving member disposed at said one side of said frame, a gearbox carried by said frame at said one side thereof and having a forwardly extending power input shaft adapted to be connected in driven relation to power take off means on the towing vehicle, said gearbox having a transversely extending power output shaft, a first drive member fixed on said power output shaft for rotation therewith, means interconnecting said first drive member and said first power receiving member and transmitting power therebetween, a second drive member journalled on said power output shaft for rotation relative thereto and disposed along one side of said first drive member, means interconnecting said second drive member and said second power receiving member and transmitting driving power therebetween, a third drive member journalled on said power output shaft for rotation relative thereto and disposed along the side of said first drive member opposite said second drive member, means interconnecting said third drive member and said third power receiving member and transmitting driving power therebetween, a first overrunning clutch having driving elements on said first drive member and coacting driven elements on said second drive member, a second overrunning clutch having driving elements on said first drive member and coacting driven elements on said third drive member whereby said second and third drive members are driven from said first drive member upon rotation of said power output shaft and are free to overrun said first drive member upon stoppage of said power output shaft.

8. A hay harvesting machine comprising a mobile frame adapted to be towed by a vehicle through a field of hay or the like to be harvested, a reciprocable sickle bar mounted on said frame and extending transverse to the direction of travel, drive means connected to said sickle bar and having a first rotary drive power receiving member disposed at one side of said frame, a hay gathering reel journalled on said frame generally above said sickle bar and extending transverse to the direction of travel of said frame, said reel having a second rotary drive power receiving member carried thereon and disposed at said one side of said frame, a pair of coacting hay conditioning rolls journalled on said frame rearwardly of said sickle bar and respectively having third and fourth rotary drive power receiving members disposed at said one side of said frame, a gearbox carried by said frame at said one side thereof and having a forwardly extending power input shaft adapted to be connected in driven relation to power take off means on the towing vehicle, said gearbox having a transversely extending power output shaft, a first drive member fixed on said power output shaft for rotation therewith, an endless belt interconnecting said first drive member and said first power receiving member, a second drive member journalled on said power output shaft for rotation relative thereto and disposed adjacent one side of said first drive member, a speed reducing endless drive train interconnecting said second drive member and said second power receiving member, a third drive member journalled on said power output shaft for rotation relative thereto and disposed adjacent the side of said first drive member opposite said second drive member, an endless chain interconnecting said third drive member and said third and fourth power receiving members, a first annular series of ratchet teeth on the side of said second drive member facing said first drive member, a second annular series of ratchet teeth on the side of said third drive member facing the side of said first drive member opposite said first series of ratchet teeth, a first drive pin carried by said first drive member for movement axially into engagement with said first series of ratchet teeth, a first spring carried by said first drive member and yieldably biasing said first pin into engagement with said first series of ratchet teeth, a second drive pin carried by said first drive member for movement axially into engagement with said second series of ratchet teeth, a second spring carried by said first drive member and yieldably biasing said second drive pin into engagement with said second series of ratchet teeth, each of said series of ratchet teeth having first surfaces engageable by the longitudinal sides of said first and second drive pins respectively upon rotation of said first drive member in one direction to drive said second and third rotatable drive members, said first and second series of ratchet teeth having second surfaces engageable with the axial ends of said first and second drive pins respectively upon stoppage of said first drive member to drive said pins axially into said first drive member in opposition to said springs and allow said second and third drive members to overrun said first drive member.

References Cited by the Examiner

UNITED STATES PATENTS

| | | | |
|---|---|---|---|
| 615,614 | 12/1898 | Flood | 192—46 |
| 728,802 | 5/1903 | Kuhlewind | 192—46 |
| 2,592,269 | 4/1952 | Getz | 56—1 |
| 2,759,315 | 8/1956 | Martin | 56—1 |
| 3,241,300 | 3/1966 | Fell et al. | 56—1 |

ANTONIO F. GUIDA, *Acting Primary Examiner.*

ABRAHAM G. STONE, P. A. RAZZANO,
*Assistant Examiners.*